(12) United States Patent
Hsu

(10) Patent No.: US 12,500,966 B2
(45) Date of Patent: Dec. 16, 2025

(54) MOBILE PHONE BACK COVER THAT CAN BE REPLACED WITH FRAGRANCE AND DECORATIVE PANEL

(71) Applicant: Cheng-Wei Hsu, New Taipei (TW)

(72) Inventor: Cheng-Wei Hsu, New Taipei (TW)

(*) Notice: Subject to any disclaimer, the term of this patent is extended or adjusted under 35 U.S.C. 154(b) by 346 days.

(21) Appl. No.: 18/305,087

(22) Filed: Apr. 21, 2023

(65) Prior Publication Data
US 2024/0283856 A1   Aug. 22, 2024

(30) Foreign Application Priority Data
Feb. 17, 2023 (TW) .................... 112201417

(51) Int. Cl.
*H04M 1/00* (2006.01)
*A61L 9/12* (2006.01)
*H04M 1/02* (2006.01)

(52) U.S. Cl.
CPC ............ *H04M 1/0202* (2013.01); *A61L 9/12* (2013.01)

(58) Field of Classification Search
CPC .... H04M 1/0202; H04M 1/02; H04M 1/0283; H04M 1/21; A61L 9/12
See application file for complete search history.

(56) References Cited

U.S. PATENT DOCUMENTS

| | | | |
|---|---|---|---|
| 9,008,738 B1* | 4/2015 | Dong | H04M 1/185 455/575.8 |
| 2008/0279729 A1* | 11/2008 | Chen | A61L 9/127 422/123 |
| 2013/0135512 A1* | 5/2013 | Kim | H04N 23/50 348/335 |
| 2013/0313017 A1* | 11/2013 | Zhu | H04M 1/0283 174/520 |
| 2015/0102079 A1* | 4/2015 | Yang | A61L 9/03 224/576 |
| 2015/0141082 A1* | 5/2015 | Ehrlich | H04B 1/3888 455/575.1 |
| 2016/0081447 A1* | 3/2016 | Planche | B29C 63/0013 455/575.8 |
| 2017/0197004 A1* | 7/2017 | Kim | A61L 9/035 |
| 2021/0382521 A1* | 12/2021 | Ajagbe | A61L 9/20 |
| 2023/0102665 A1* | 3/2023 | Coverstone | H04M 1/185 455/575.1 |
| 2024/0283856 A1* | 8/2024 | Hsu | A61L 9/12 |

* cited by examiner

*Primary Examiner* — Md K Talukder

(57) ABSTRACT

A mobile phone back cover includes a fragrance unit including a hollow body with a plurality of pores to be arranged on one side of the camera lens of a mobile phone and an aroma material accommodated in the hollow body, a decorative panel decorated with different flat or three-dimensional patterns, characters or commercial advertisement graphics to be located at the bottom side relative the camera lens and the hollow body, and a frame detachably combined with the mobile phone to combine the hollow body and the decorative panel on the back of the mobile phone.

15 Claims, 17 Drawing Sheets

MOBILE PHONE BACK COVER THAT CAN BE REPLACED WITH FRAGRANCE AND DECORATIVE PANEL

BACKGROUND OF THE INVENTION

1. Field of the Invention

The present invention relates to a mobile phone back cover that can be replaced with fragrance and decorative panel, especially a mobile phone back cover design that can emit fragrance and increase the beauty and texture of the mobile phone.

2. Description of the Related Art

The well-known mobile phone, in order to enhance the aesthetics and anti-drop purposes, so some operators continue to introduce mobile phone protective back covers with different patterns. When the mobile phone is used for a period of time and wants to change the mobile phone protective back cover with different patterns, it is necessary to purchase a mobile phone protective back cover with various patterns, which will cause a burden to consumers.

The known mobile phone protective back cover is only for decoration and protection of the mobile phone, and has no fragrance design. At present, mobile phones have become more and more inseparable products for modern people, and play an indispensable role in modern life. Because the mobile phone is a convenient and fast modern communication tool, it is quite common for everyone to have one mobile phone, or even two mobile phones. If the mobile phone carried by each person, in addition to being equipped with a mobile phone protective back cover that enhances the aesthetics and can be replaced at will, also has the function of emitting fragrance, it will definitely enhance the additional functions of the mobile phone and create an environment atmosphere, giving people fragrance and healing. Even through the mobile phone that you carry with you, you can emit a refreshing fragrance to boost your spirits, improve work efficiency, and prevent dozing off while driving, so as to improve driving safety.

SUMMARY OF THE INVENTION

The main purpose of the present invention is to use the optional replaceable hollow body filled with aroma material, which can emit fragrance, create an environment atmosphere, and give people fragrance and healing. Even through the moile mobile phone, it emits a refreshing fragrance to boost the spirit, improve work efficiency, prevent dozing off while driving, improve driving safety, and enhance the additional functions of the mobile phone.

The second purpose of the present invention is mainly to achieve the purpose of increasing the aesthetic feeling and texture of the mobile phone through the decoration of different patterns or characters on the surface of the decorative panel which can be replaced arbitrarily.

The mobile phone back cover of the present invention comprises a fragrance unit, a decorative panel and a frame. The fragrance unit is composed of a hollow body, and the hollow body is to be arranged on one side of the camera lens of a mobile phone. The decorative panel is to be located under the camera lens of the mobile phone and the hollow body. An aroma material can be accommodated in the hollow body, and a plurality of pores for the aroma material to emit fragrance are arranged on the front of the hollow body. The surface of the decorative panel is decorated with different plane or three-dimensional patterns, characters or commercial advertisement graphics. The hollow body and the decorative panel are provided with peripheral edges for fastening by a flange of the frame. When the frame is combined with the mobile phone, the hollow body and the decorative panel can be combined on the back of the mobile phone at the same time, so as to achieve the purpose of distributing fragrance and increasing the beauty and texture of the mobile phone. The hollow body and the decorative panel can be replaced arbitrarily according to the needs, so as to produce different aromas and decoration of different patterns or characters.

At the bottom of the hollow body, a buckle edge is formed. When the hollow body and the decorative panel are combined on the back of the mobile phone at the same time, the decorative panel is stuck to the buckle edge of the hollow body, making the hollow body more stable after combination.

The second embodiment of the present invention comprises a hollow body, a camera lens protective glass, a decorative panel and a frame. The camera lens protective glass is installed on the side of hollow body. The hollow body and the camera lens protective glass are integrally formed. The decorative panel is located under the camera lens protective glass and the hollow body. An aroma material can be accommodated in the hollow body, and a plurality of pores for the aroma material to emit fragrance are arranged on the front of the hollow body. The surface of the decorative panel is decorated with different plane or three-dimensional patterns, characters or commercial advertisement graphics. The hollow body, the camera lens protective glass and the decorative panel are provided with peripheral edges for fastening by a flange of the frame. When the frame is combined with the mobile phone, the hollow body, the camera lens protective glass and the decorative panel can be combined on the back of the mobile phone at the same time, so that the camera lens protective glass integrated with the hollow body can be assembled on the camera lens of the mobile phone so as to achieve the purpose of protecting the lens, emitting fragrance and increasing the beauty and texture of the mobile phone.

The third embodiment of the present invention comprises a hollow body, a camera lens protective glass, a decorative panel and a frame. The camera lens protective glass is installed on the side of hollow body. The decorative panel is located under the hollow body and the camera lens protective glass. The hollow body, the camera lens protective glass and the are integrally formed. An aroma material can be accommodated in the hollow body, and a plurality of pores for the aroma material to emit fragrance are arranged on the front of the hollow body. The surface of the decorative panel is decorated with different plane or three-dimensional patterns, characters or commercial advertisement graphics. The hollow body, the camera lens protective glass and the decorative panel are provided with peripheral edges for fastening by a flange of the frame. When the frame is combined with the mobile phone, the hollow body, the camera lens protective glass and the decorative panel can be combined on the back of the mobile phone at the same time, so that the camera lens protective glass located on the side of the hollow body can be assembled on the camera lens of the mobile phone to achieve the purpose of protecting the lens, emitting fragrance and increasing the beauty and texture of the mobile phone.

In another embodiment of the decorative panel of the present invention, the decorative panel comprises a bottom plate with accommodating space and a transparent panel. The decorative panel has a peripheral edge. In the accommodating space of the bottom plate, a plurality of isolated accommodating areas are formed, and a plurality of ornaments are filled in each accommodating area, and then encapsulated with the transparent panel. When the hand holds the mobile phone and shakes, the ornaments will shake in each accommodating area and produce a sound effect, and at the same time produce a decorative aesthetic feeling.

Furthermore, the ornaments can be colored granules, or various small flat or three-dimensional objects. Accommodating areas of different shapes formed by various figures can be provided on the decorative panel as required. The patterns on the aforementioned decorative panel can be not only planar patterns, but also three-dimensional patterns. The processed granular ore can also be used as the substrate, and a single or multiple granular ore of different colors can be adhered to the decorative panel to enhance the texture.

DETAILED DESCRIPTION OF THE PREFERRED EMBODIMENT

Figure 1:
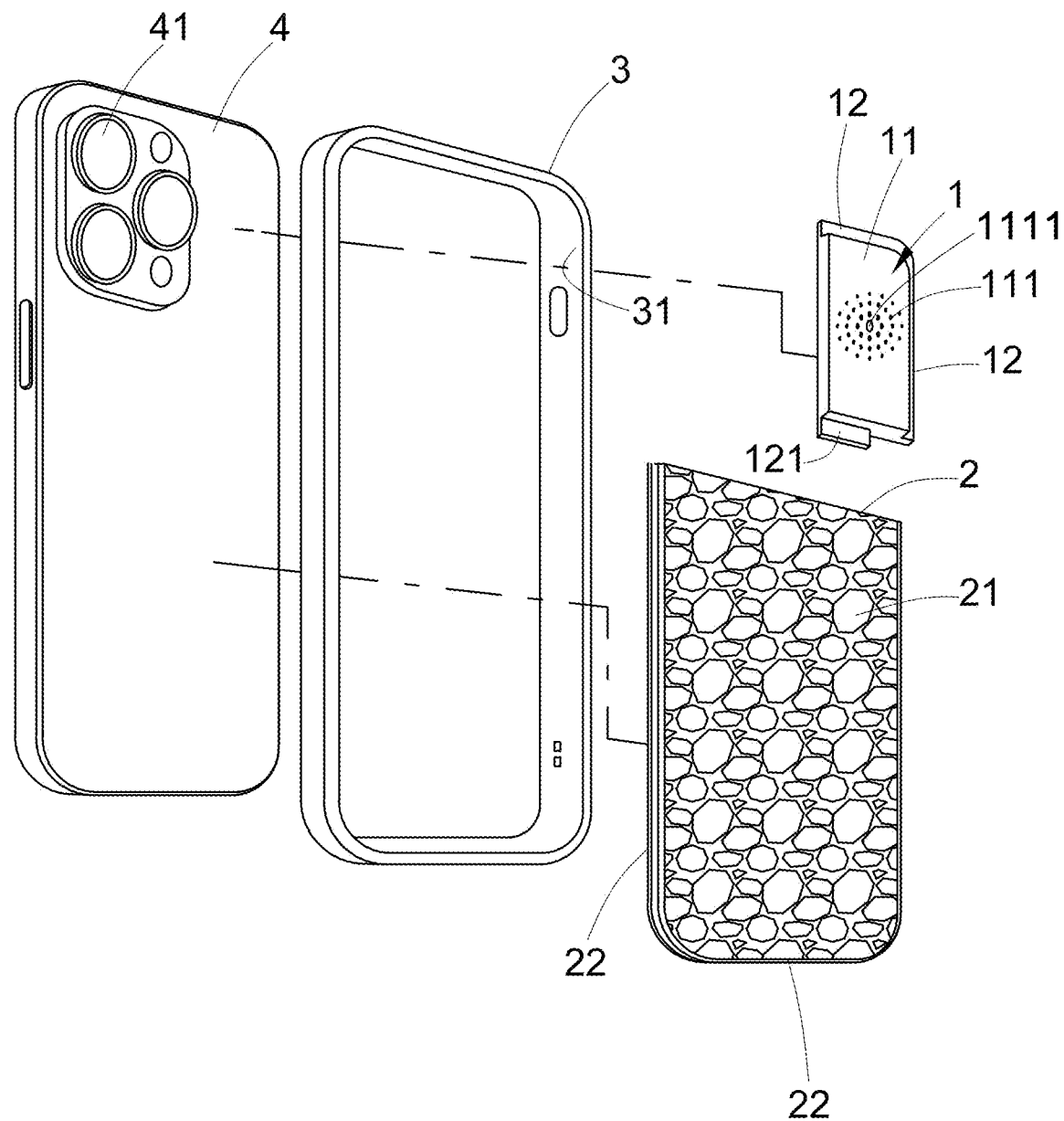
FIG. 1 is an exploded perspective view of one of the preferred embodiments of the present invention.
Figure 2:
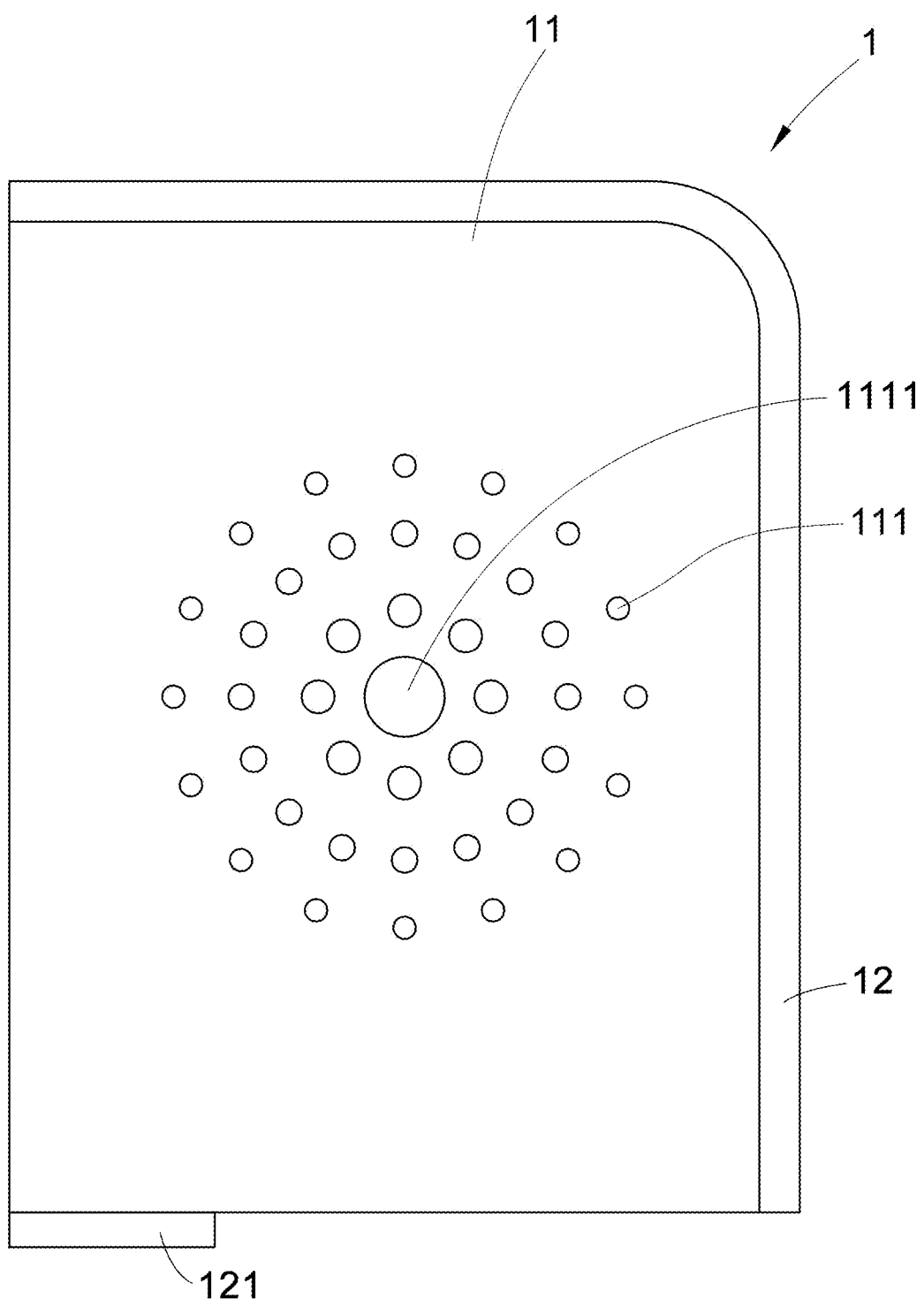
FIG. 2 is an enlarged picture of the hollow body of the present invention.
Figure 3:
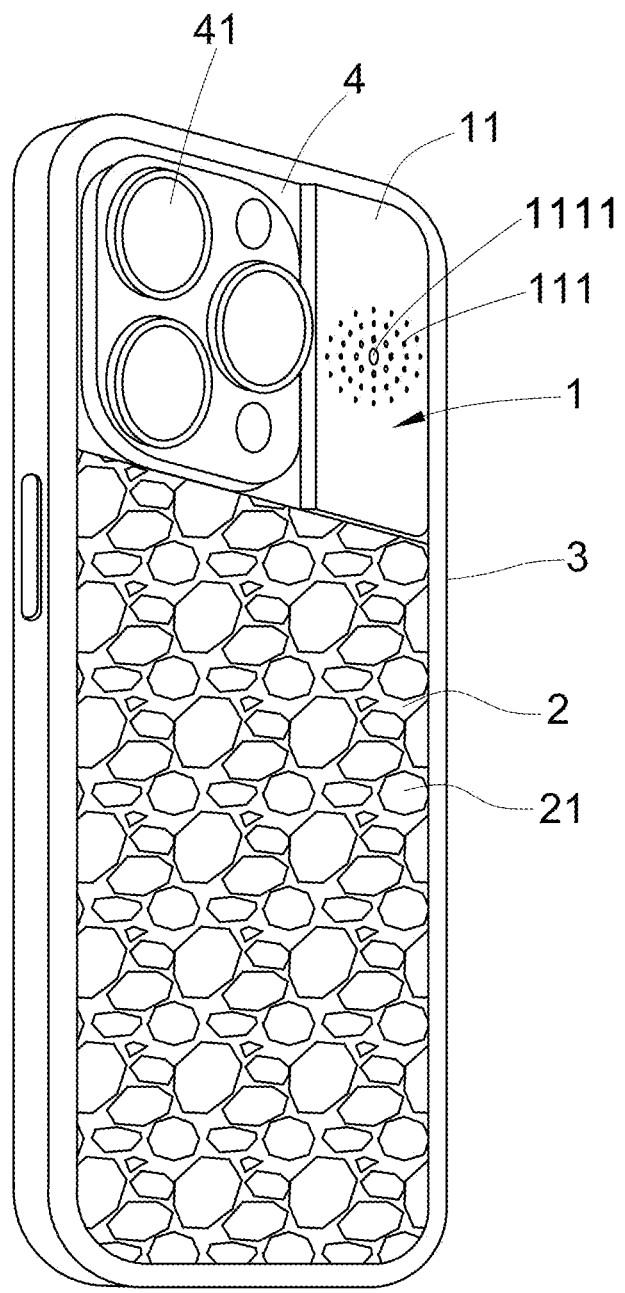
FIG. 3 is the combined perspective view of the structure shown in FIG. 1.
Figure 4:
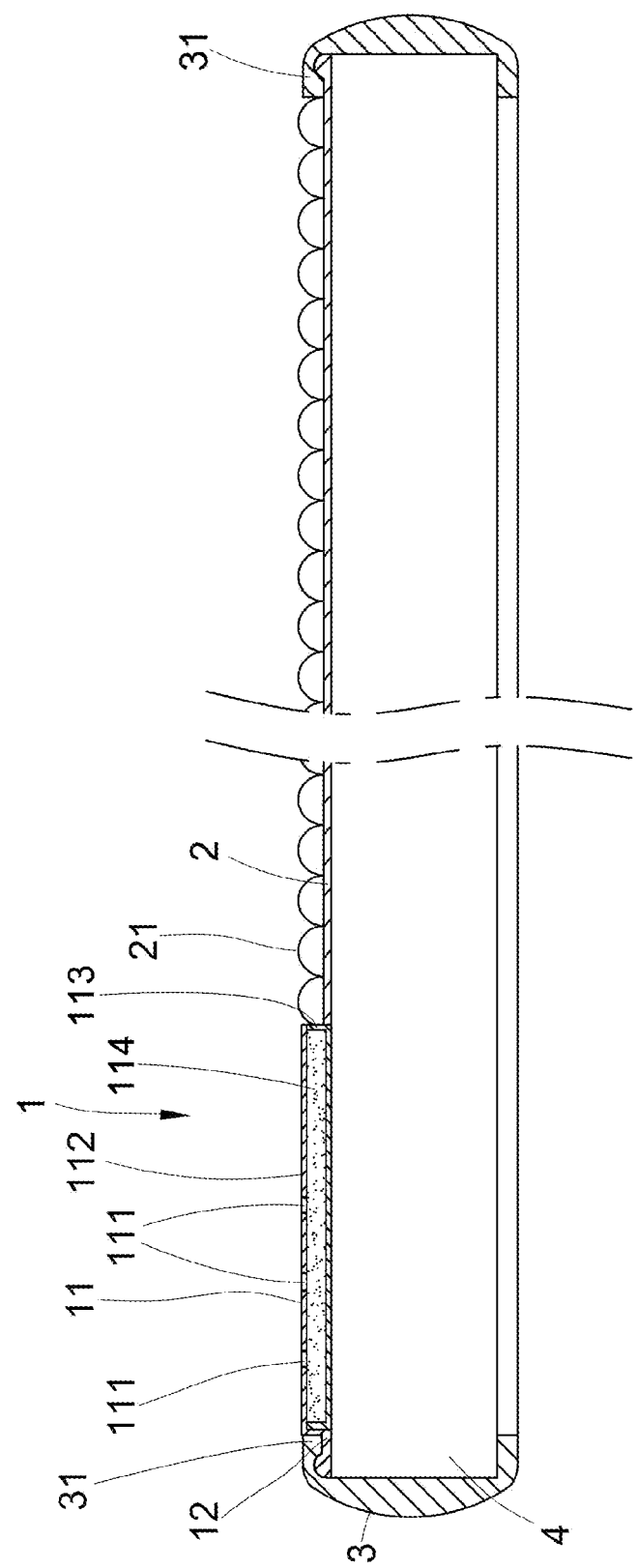
FIG. 4 is a cross-sectional view of the structure shown in FIG. 3.

Please refer to FIG. 1, FIG. 2 and FIG. 3, the present invention is related to a mobile phone back cover that can be replaced with fragrance and decorative panel. The mobile phone back cover comprises a fragrance unit 1, a decorative panel 2 and a frame 3. The fragrance unit 1 is composed of a hollow body 11, and the hollow body 11 is to be arranged on one side of the camera lens 41 of a mobile phone 4. The decorative panel 2 is to be located under the camera lens 41 of the mobile phone 4 and the hollow body 11. An aroma material can be accommodated in the hollow body 11, and a plurality of pores 111 for the aroma material to emit fragrance are arranged on the front of the hollow body 11. The surface of the decorative panel 2 is decorated with different plane or three-dimensional patterns 21, characters or commercial advertisement graphics. The hollow body 11 and the decorative panel 2 are provided with peripheral edges 12, 22 for fastening by a flange 31 of the frame 3. When the frame 3 is combined with the mobile phone 4, the hollow body 11 and the decorative panel 2 can be combined on the back of the mobile phone 4 at the same time (as shown in FIG. 4), so as to achieve the purpose of distributing fragrance and increasing the beauty and texture of the mobile phone. The hollow body 11 and the decorative panel 2 can be replaced arbitrarily according to the needs, so as to produce different aromas and decoration of different patterns 21 or characters.

Figure 10:
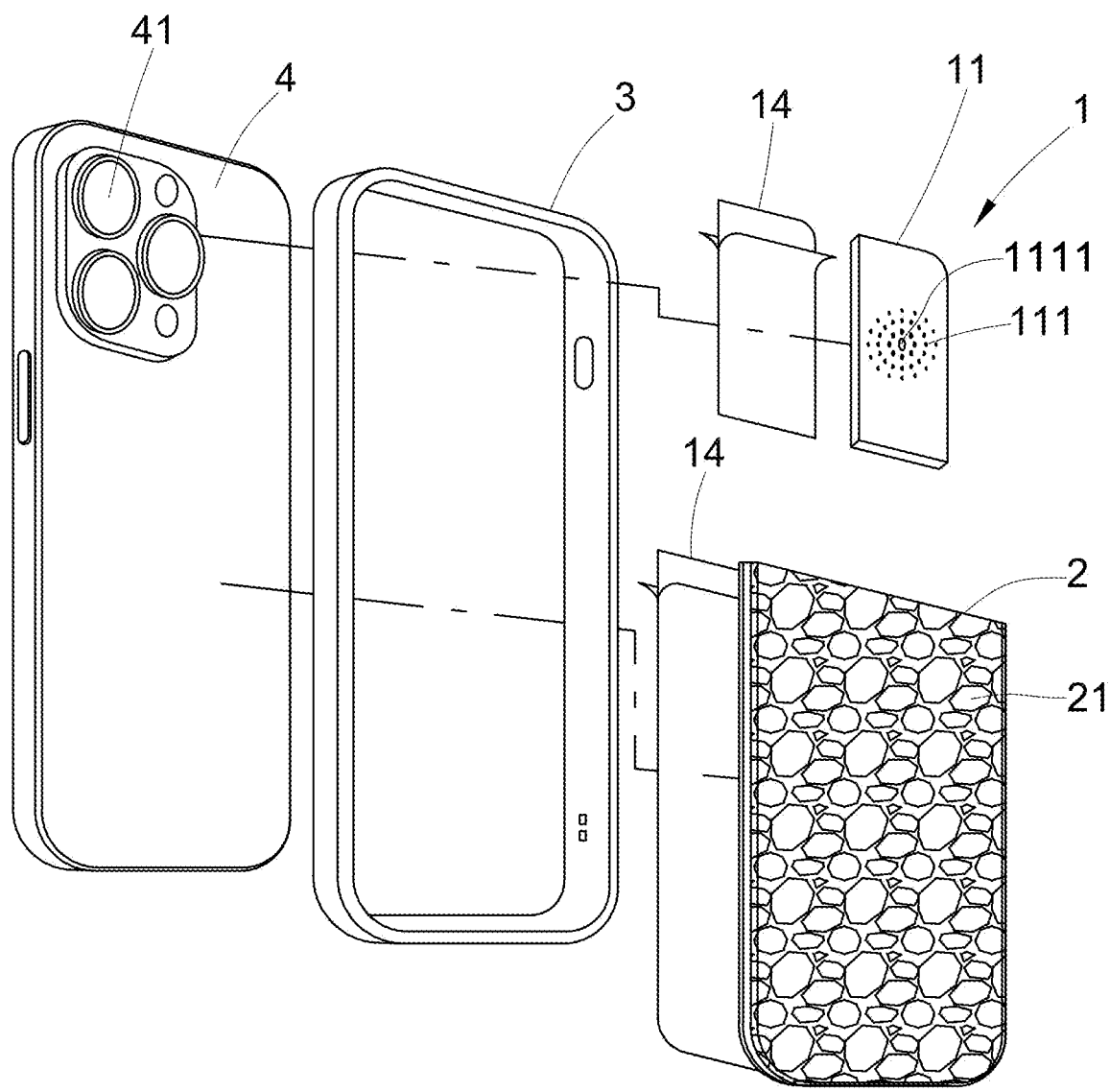
FIG. 10 is a three-dimensional exploded view of an embodiment of the present invention that uses double-sided adhesive to simultaneously combine the hollow body and the decorative panel on the back of the mobile phone.
Figure 11:
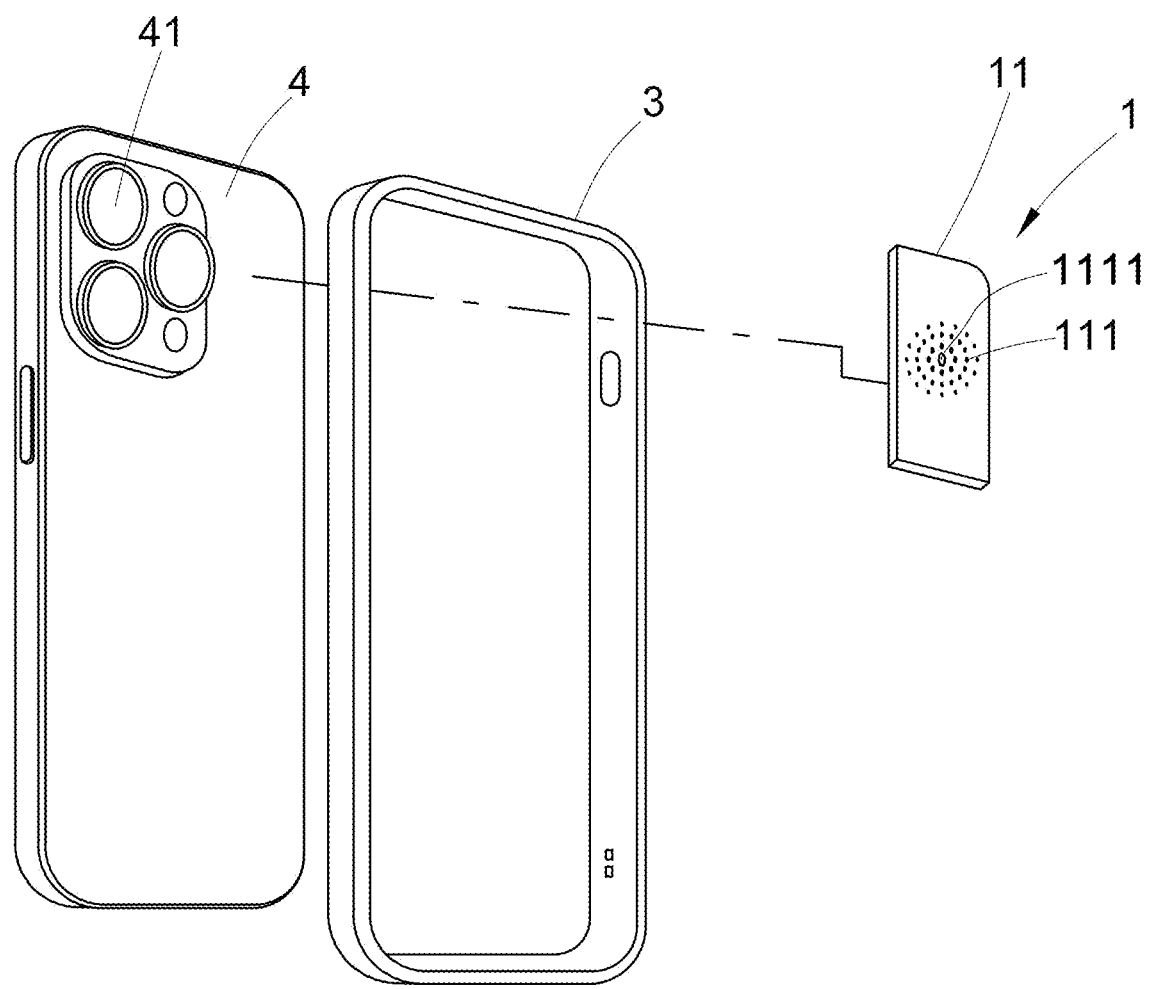
FIG. 11 is a three-dimensional exploded view of the embodiment of the present invention when only a hollow body is provided on the back of the mobile phone.

At the bottom of the hollow body 11, a buckle edge 121 is formed. When the hollow body 11 and the decorative panel 2 are combined on the back of the mobile phone 4 at the same time, the decorative panel 2 is stuck to the buckle edge 121 of the hollow body 11, making the hollow body 11 more stable after combination. Double-sided adhesive tape 14 can also be used to combine the hollow body 11 and the decorative panel 2 on the back of the mobile phone 4 at the same time (as shown in FIG. 10). The present invention can also simply set the hollow body 11 on the back of the mobile phone 4 (as shown in FIG. 11).

Figure 7:
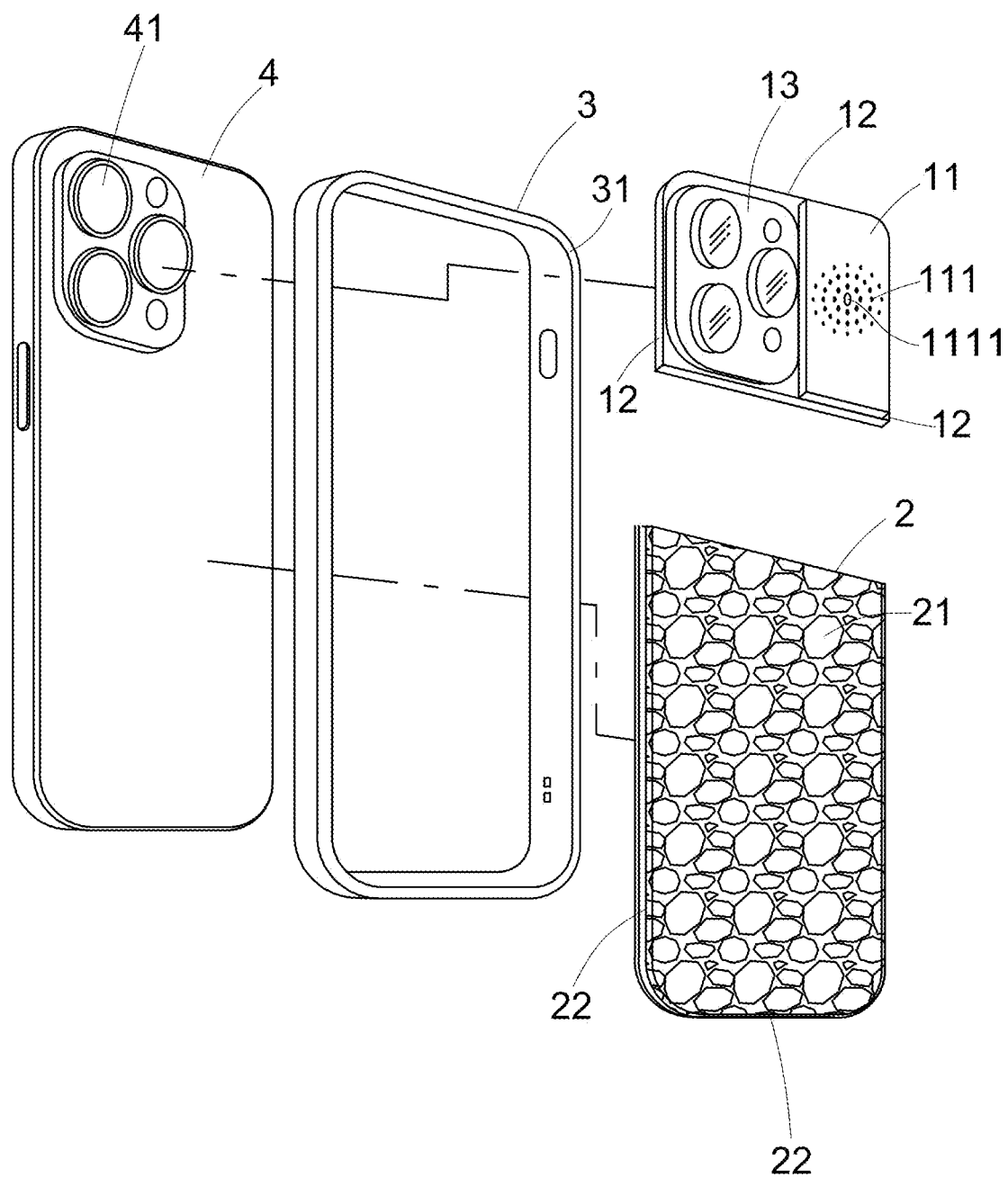
FIG. 7 is a three-dimensional exploded view of the second embodiment of the present invention.
Figure 8:
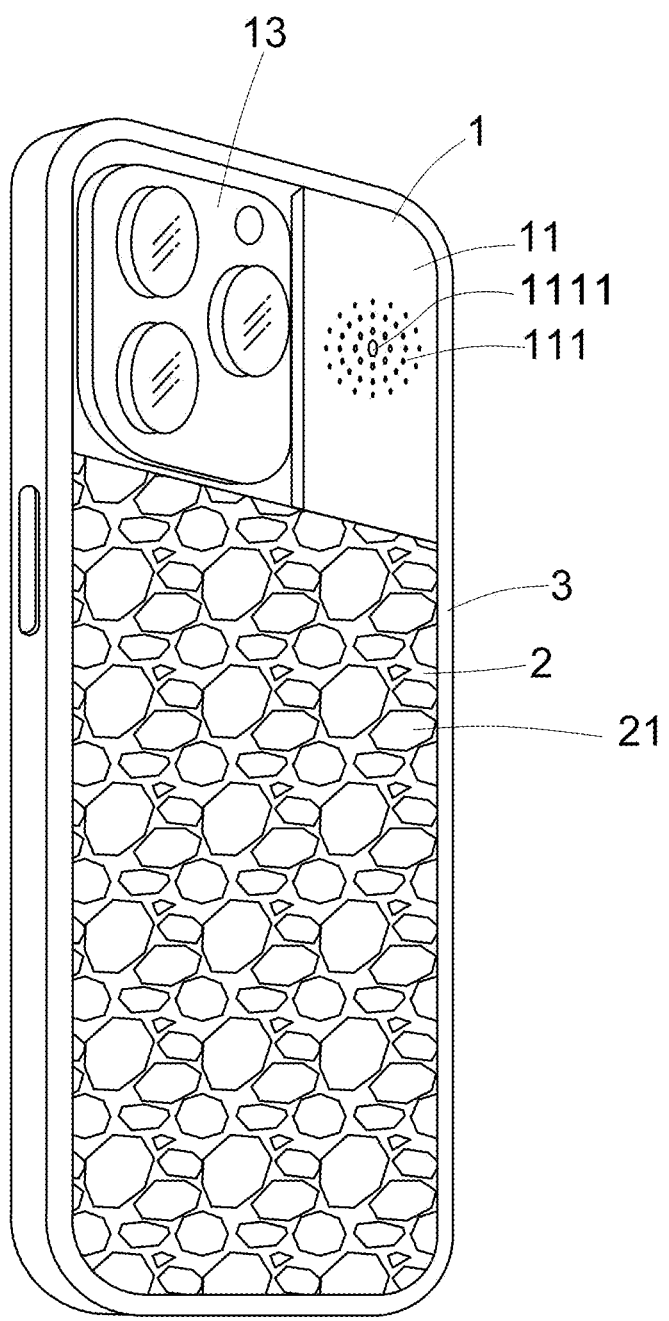
FIG. 8 is a combined perspective view of the structure shown in FIG. 7.

Please refer to the FIG. 7, which is the second embodiment of the present invention. It comprises a hollow body 11, a camera lens protective glass 13, a decorative panel 2 and a frame 3. The camera lens protective glass 13 is installed on the side of hollow body 11. The hollow body 11 and the camera lens protective glass 13 are integrally formed. The decorative panel 2 is located under the camera lens protective glass 13 and the hollow body 11. An aroma material can be accommodated in the hollow body 11 (as shown in FIG. 4), and a plurality of pores 111 for the aroma material to emit fragrance are arranged on the front of the hollow body 11. The surface of the decorative panel 2 is decorated with different plane or three-dimensional patterns 21, characters or commercial advertisement graphics. The hollow body 11, the camera lens protective glass 13 and the decorative panel 2 are provided with peripheral edges 12, 22 for fastening by a flange 31 of the frame 3. When the frame 3 is combined with the mobile phone 4, the hollow body 11, the camera lens protective glass 13 and the decorative panel 2 can be combined on the back of the mobile phone 4 at the same time, so that the camera lens protective glass 13 integrated with the hollow body 11 can be assembled on the camera lens 41 of the mobile phone 4 (as shown in FIG. 8) so as to achieve the purpose of protecting the lens, emitting fragrance and increasing the beauty and texture of the mobile phone.

Figure 9:
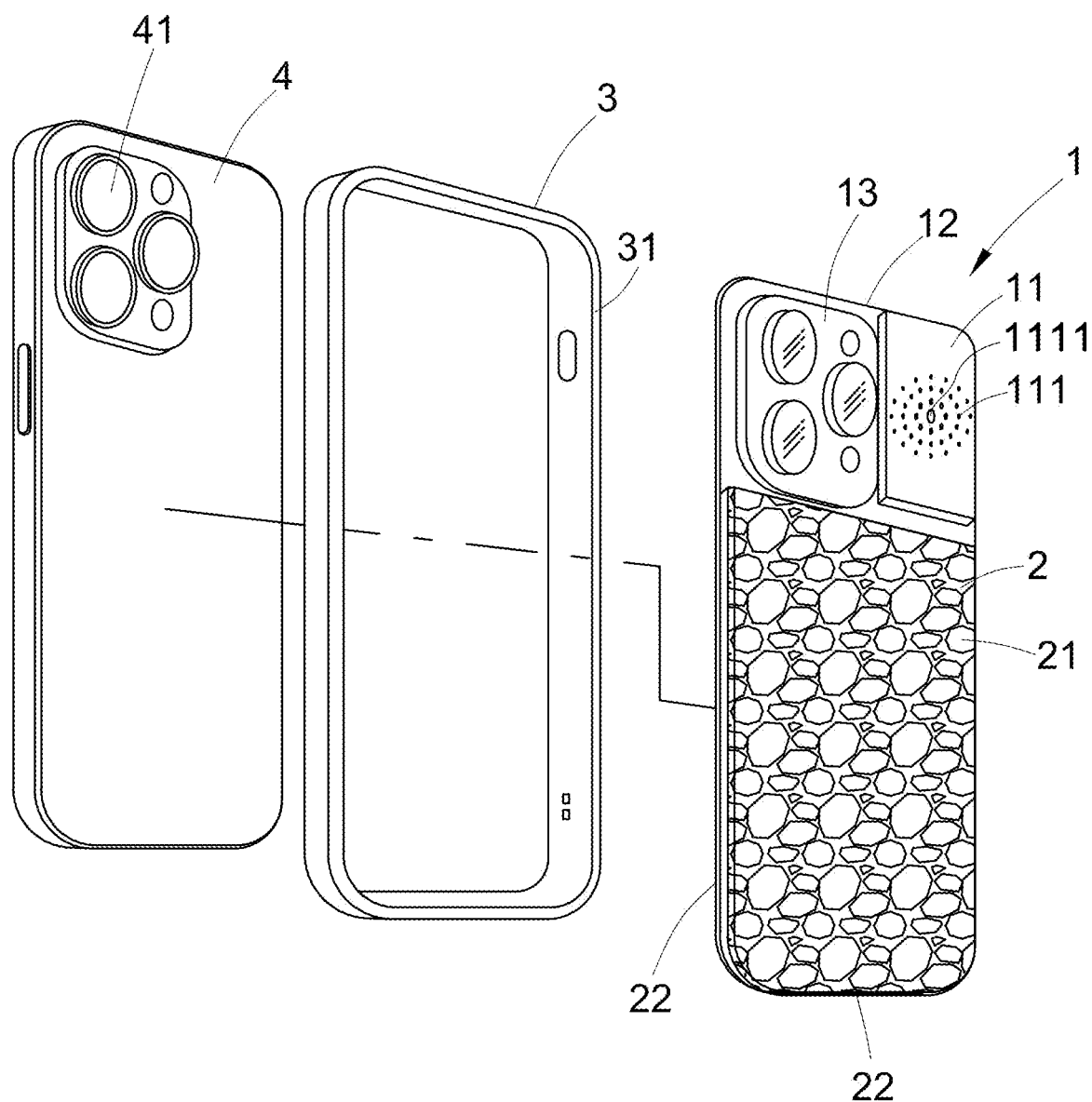
FIG. 9 is an exploded perspective view of the third embodiment of the present invention.

Please refer to the FIG. 9, which is the third embodiment of the present invention. It comprises a hollow body 11, a camera lens protective glass 13, a decorative panel 2 and a frame 3. The camera lens protective glass 13 is installed on the side of hollow body 11. The decorative panel 2 is located under the hollow body 11 and the camera lens protective glass 13. The hollow body 11, the camera lens protective glass 13 and the are integrally formed. An aroma material can be accommodated in the hollow body 11 (as shown in FIG. 4), and a plurality of pores 111 for the aroma material to emit fragrance are arranged on the front of the hollow body 11. The surface of the decorative panel 2 is decorated with different plane or three-dimensional patterns 21, characters or commercial advertisement graphics. The hollow body 11, the camera lens protective glass 13 and the decorative panel 2 are provided with peripheral edges 12, 22 for fastening by a flange 31 of the frame 3. When the frame 3 is combined with the mobile phone 4, the hollow body 11, the camera lens protective glass 13 and the decorative panel 2 can be combined on the back of the mobile phone 4 at the same time, so that the camera lens protective glass 13 located on the side of the hollow body 11 can be assembled on the camera lens 41 of the mobile phone 4 to achieve the purpose of protecting the lens, emitting fragrance and increasing the beauty and texture of the mobile phone.

Figure 5:
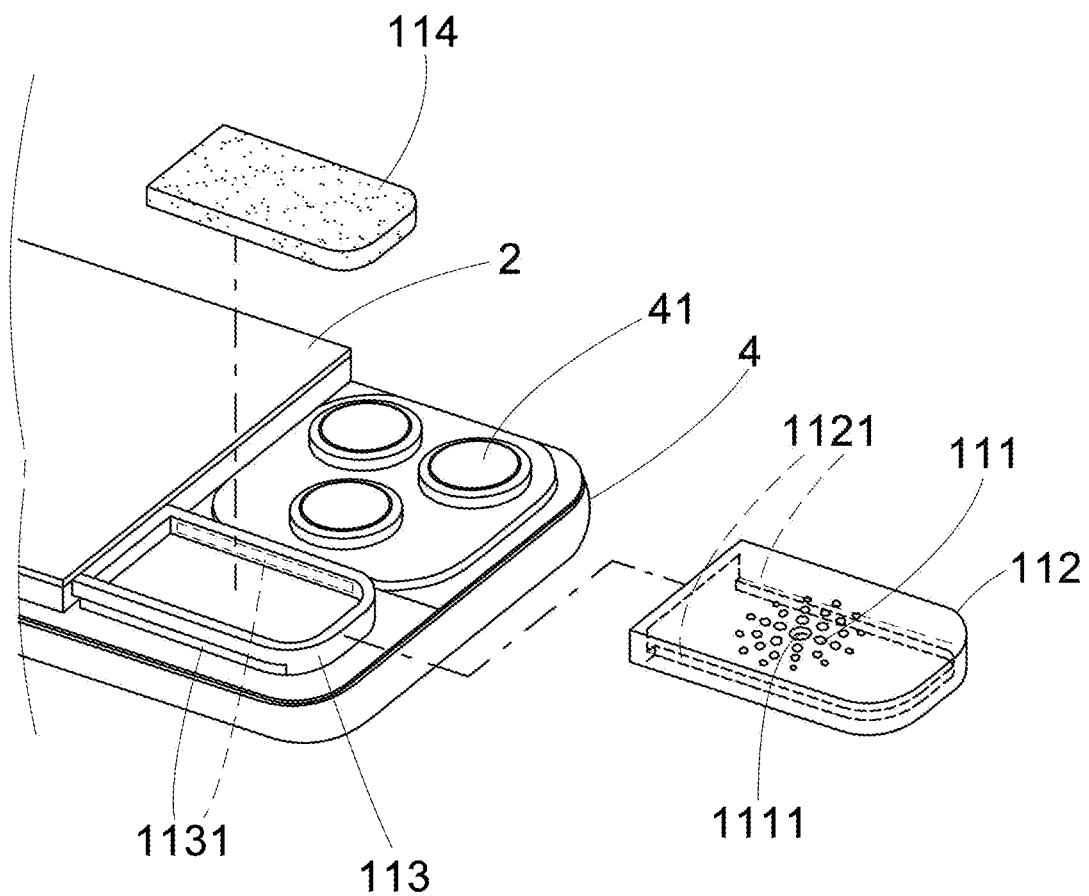
FIG. 5 is a three-dimensional exploded view of the hollow body of the present invention.
Figure 6:
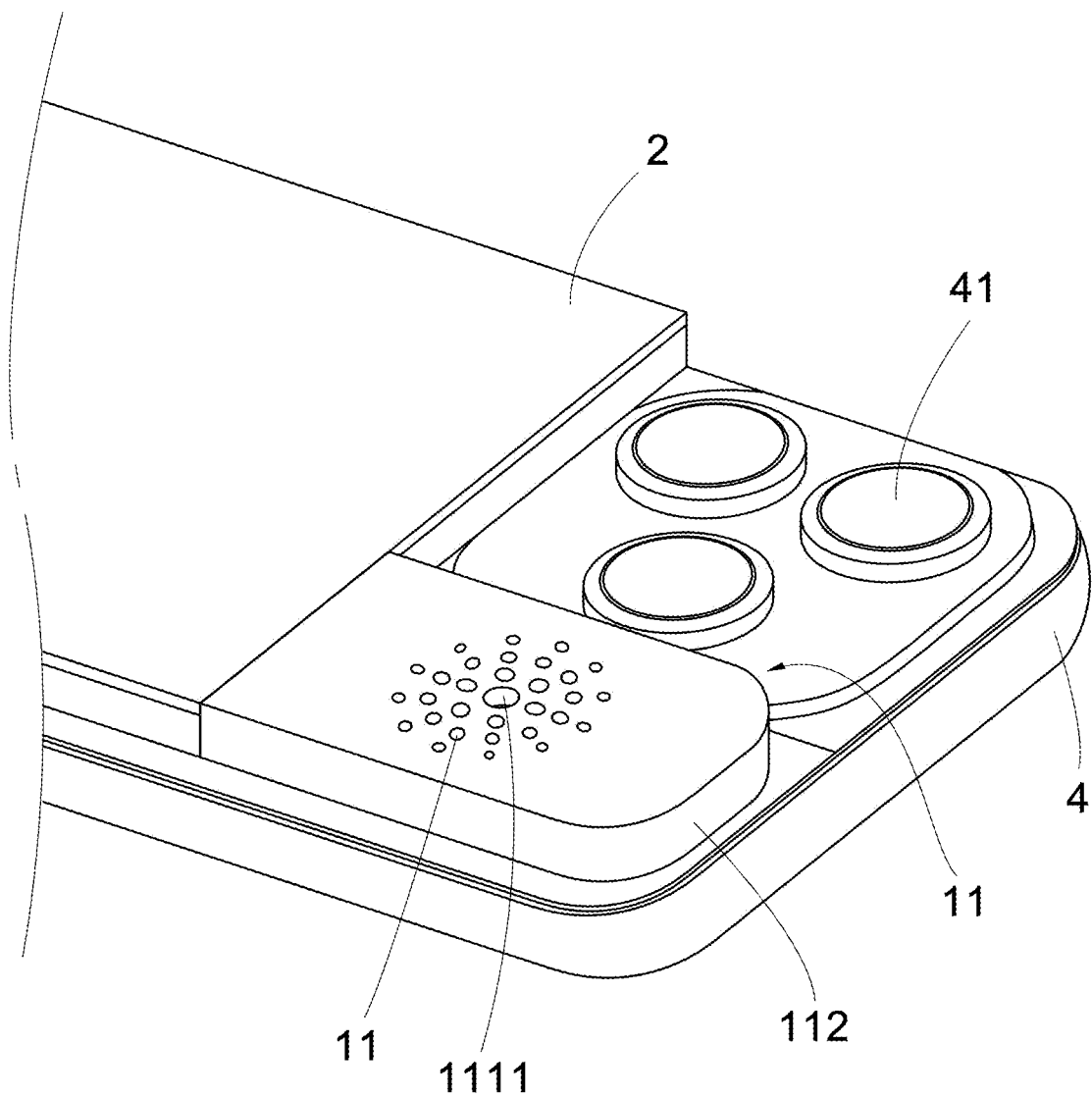
FIG. 6 is a combined perspective view of the hollow body of the present invention.

The hollow body 11 of the fragrance unit 1 comprises an upper box body 112 and a lower accommodating box 113. The aforesaid pores 111 are set on the upper box body 112. A high absorbency carrier 114 is installed in the lower accommodating box 113. Corresponding rail grooves 1131 are provided on both sides of the lower accommodating box 113, and rails 1121 that can be matched with the rail grooves 1131 are provided on the inner edges of both sides of the upper box body 112. The user can remove the upper box body 112 (as shown in FIG. 5), add the required essential oil to the high absorbency carrier 114 in the lower accommodating box 113, and then combine the upper box body 112 and the lower accommodating box 113 combinations (as shown in FIG. 6). The high absorbency carrier 114 that absorbs essential oils will slowly continue to release the aroma from the plural pores 111. When it is necessary to replace essential oils with different aromas, the high absorbency carrier 114 can be taken out and a new high absorbency carrier 114 can be inserted, so as to easily replace different aromas. In the upper box body 112, there are a plurality of pores 111 for fragrance distribution. There is a large hole 1111 in the center. When adding essential oil at ordinary times, the essential oil can be dripped into the internal high absorbency carrier 114 from the large hole 1111, without taking out the upper box body 112, which makes it more convenient to add essential oil at ordinary times.

Figure 12:
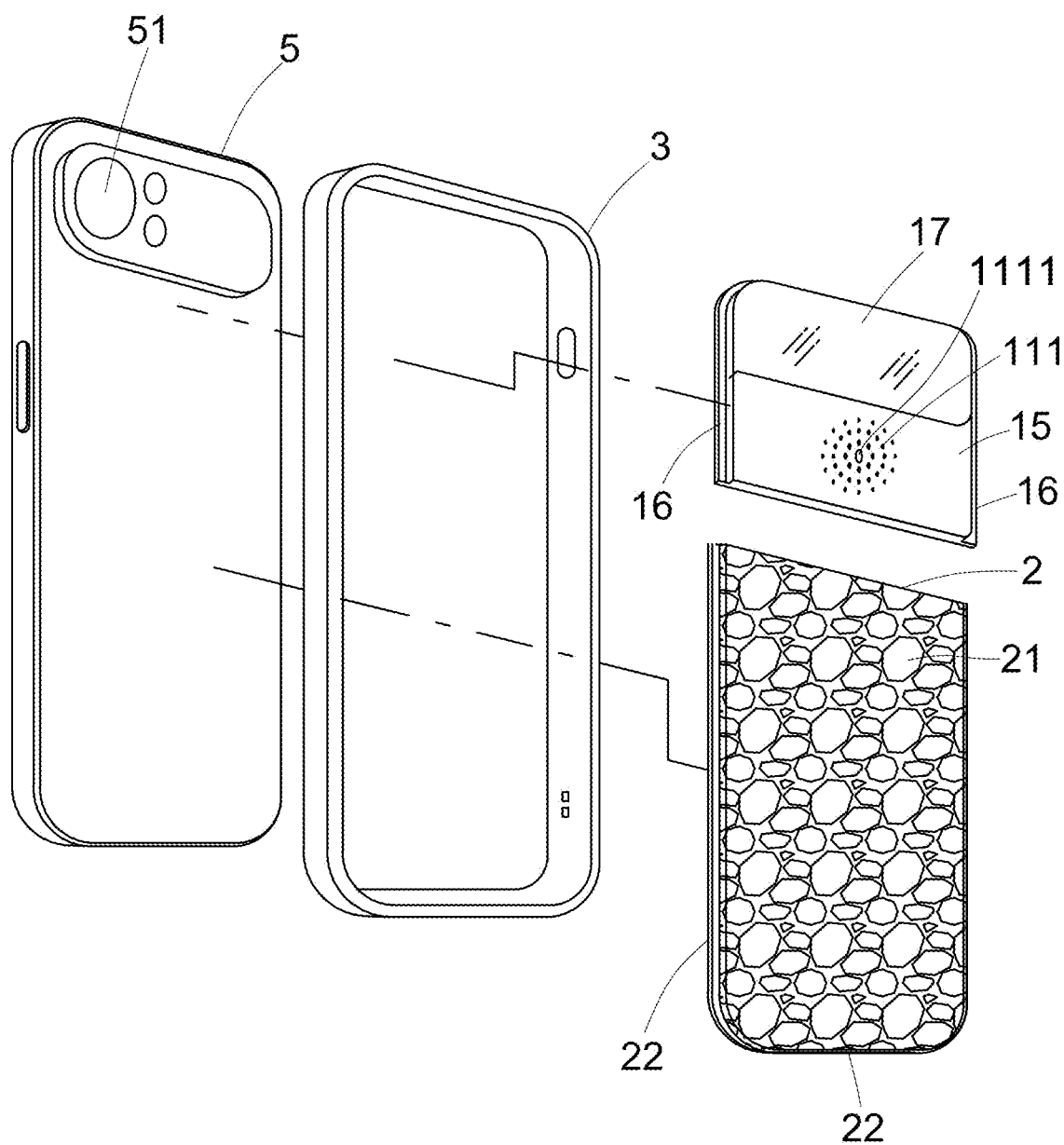
FIG. 12 is a three-dimensional exploded view of an application embodiment of the present invention used in another mobile phone with a camera lens of a different type.

FIG. 12 shows an application example of the present invention used in another mobile phone 5 with a different type of camera lens 51. The camera lens 51 of this type of mobile phone 5 is arranged horizontally on the top edge of the back of the mobile phone 5 in a horizontal strip. The hollow body 15 of the present invention can also be arranged horizontally with the camera lens protective glass 17 used in it, which is also elongated and horizontally arranged with three peripheral edges to form side edges 16, so as to be compatible with various mobile phone brands and models.

Figure 13:
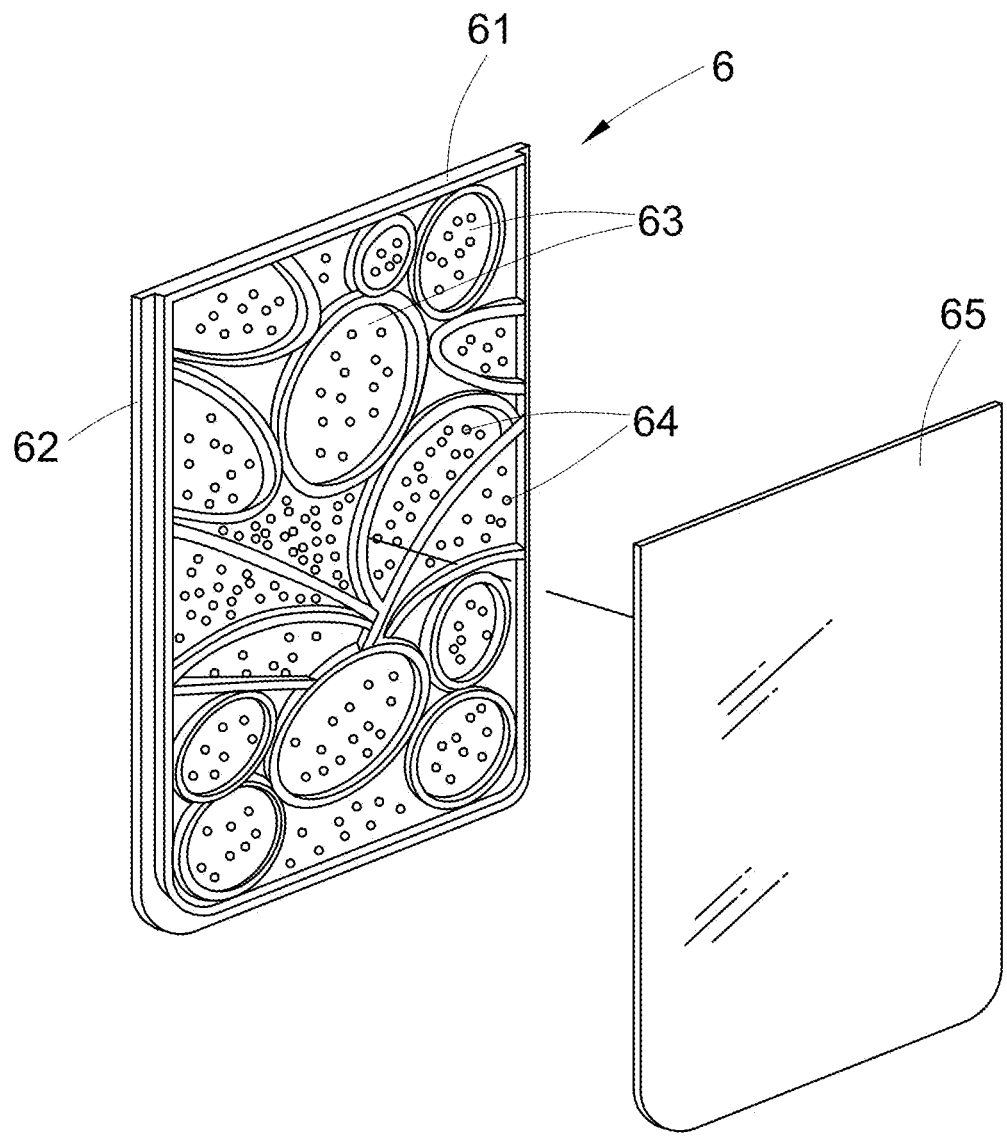
FIG. 13 is an exploded perspective view of another embodiment of the decorative panel of the present invention.
Figure 14:
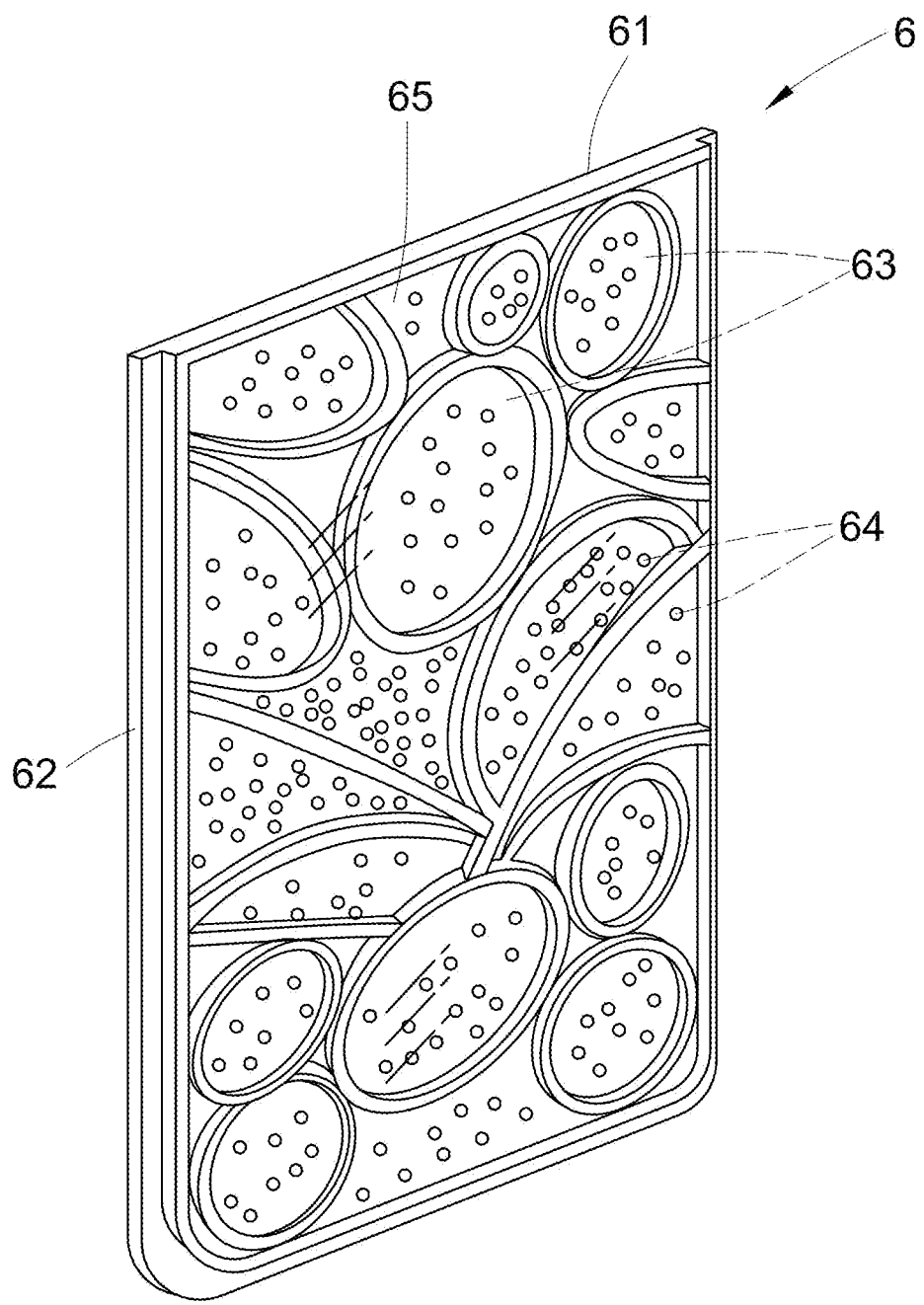
FIG. 14 is a combined perspective view of the structure shown in FIG. 13.
Figure 15:
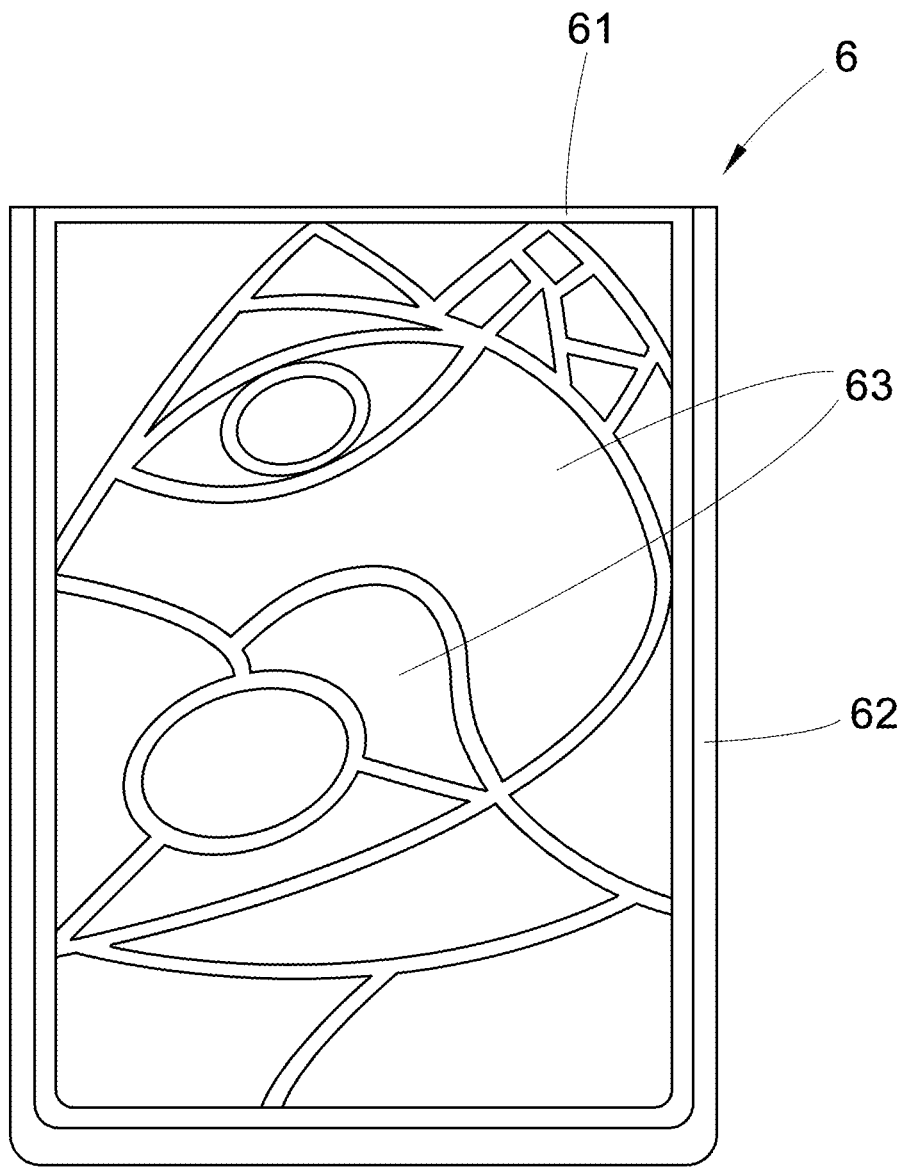
FIG. 15 and FIG. 16 are the embodiment diagrams of the present invention showing another two kinds of graphic accommodating spaces on the decorative panel shown in FIG. 13.
Figure 16:
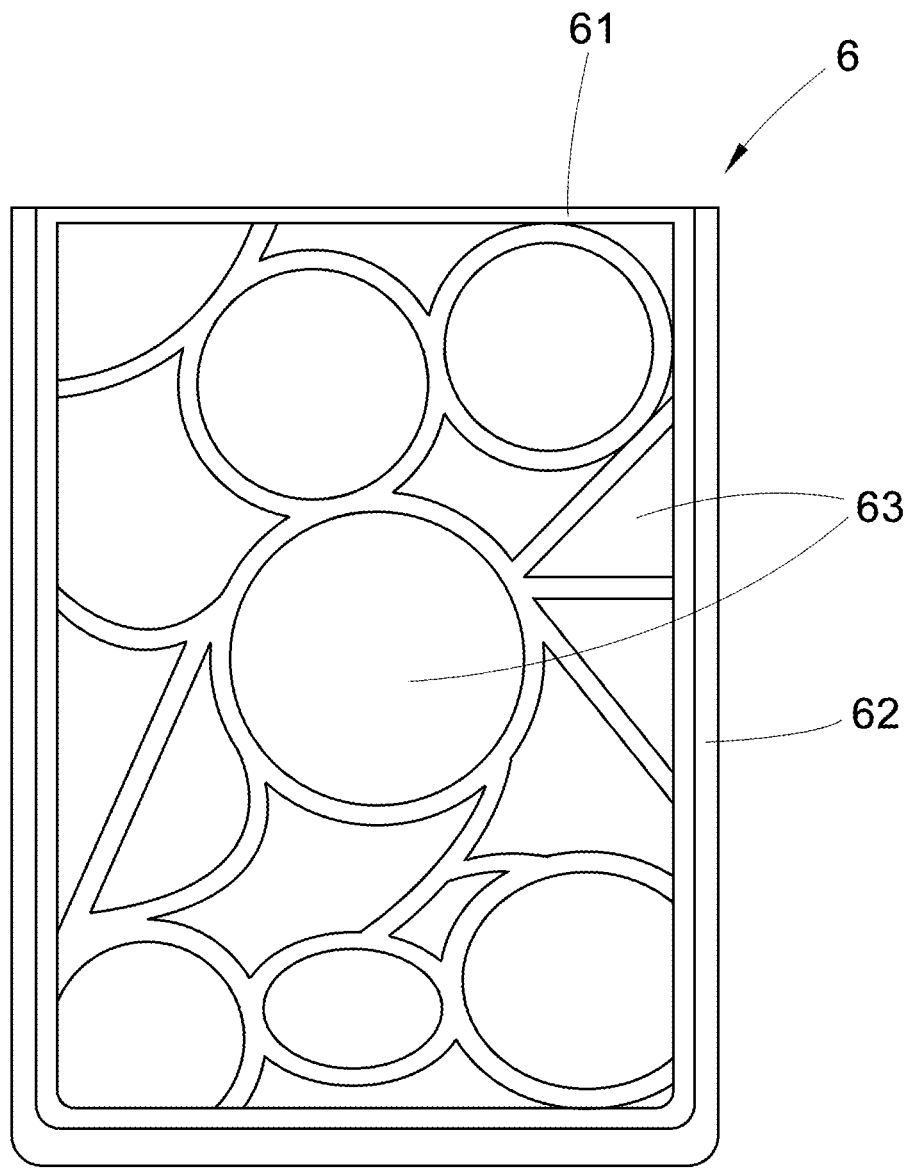

Please refer to FIG. 13 and FIG. 14, which is another embodiment of the decorative panel of the present invention. The described decorative panel 6 and the aforementioned decorative panel 2 are all located under the camera lens 41 of the mobile phone 4 and the hollow body 11, and are also used for mobile phone 4 decoration. The decorative panel 6 comprises a bottom plate 61 with accommodating space and a transparent panel 65. The decorative panel 6 has a peripheral edge 62. In the accommodating space of the bottom plate 61, a plurality of isolated accommodating areas 63 are formed, and a plurality of ornaments 64 are filled in each accommodating area 63, and then encapsulated with the transparent panel 65. When the hand holds the mobile phone 4 and shakes, the ornaments 64 will shake in each accommodating area 63 and produce a sound effect, and at the same time produce a decorative aesthetic feeling. The ornaments 64 can be colored granules, or various small flat or three-dimensional objects. Accommodating areas 63 of different shapes formed by various figures can be provided on the decorative panel 6 as required (as shown in FIG. 15 and FIG. 16). The patterns 21 on the aforementioned decorative panel 2 can be not only planar patterns, but also three-dimensional patterns. The processed granular ore can also be used as the substrate, and a single or multiple granular ore of different colors can be adhered to the decorative panel 2 to enhance the texture.

Figure 17:
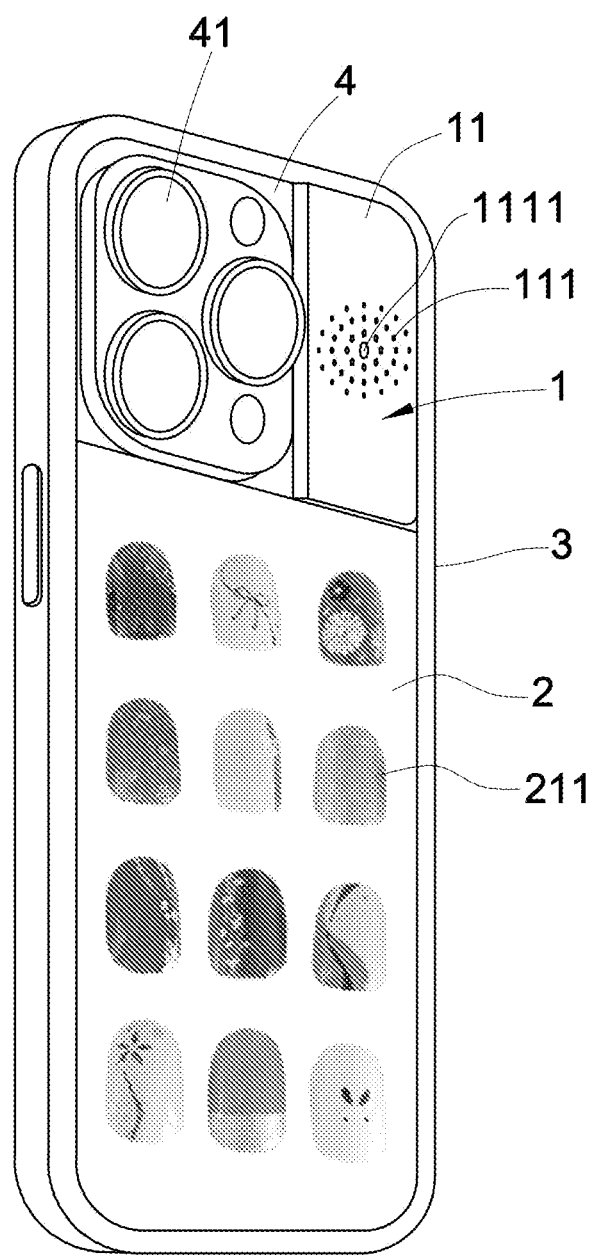
FIG. 17 is a schematic diagram of the present invention that can be printed or attached on the decorative panel to represent the advertising pattern of its business type.

To sum up, the present invention provides a hollow body and decorative panel filled with aroma material that can be replaced arbitrarily, which can emit fragrance, create an ambient atmosphere, and give people fragrance and healing. Even through the portable mobile phone, it emits a refreshing fragrance to boost the spirit, improve work efficiency, prevent dozing off while driving, improve driving safety, and enhance the additional functions, aesthetics and texture of the mobile phone. It can be printed on or attached to the decorative panel 2 to represent its business type such as "nail art" or other advertising patterns 211, so as to achieve the purpose of another type of mobile advertising (as shown in FIG. 17).

What the invention claimed is:

1. A mobile phone back cover, comprising:
   a fragrance unit comprising a hollow body to be arranged on one side of the camera lens of a mobile phone and an aroma material accommodated in said hollow body, said hollow body comprising a plurality of pores for said aroma material to emit fragrance;
   a decorative panel to be located at a bottom side relative said camera lens of said mobile phone and said hollow body, said decorative pane having a surface thereof decorated with different flat or three-dimensional patterns, characters or commercial advertisement graphics; and
   a frame to be detachably combined with said mobile phone to combine said hollow body and said decorative panel on the back of said mobile phone;
   wherein said hollow body of said fragrance unit comprises an upper box body, a lower accommodating box and a high absorbency carrier installed in said lower accommodating box, said upper box body having both sides thereof respectively provided with a rail groove, said upper box body having an inner edge of each of both sides thereof respectively provided with a rail that is matched with one respective said rail groove; said pores are set on said upper box body.

2. The mobile phone back cover as claimed in claim 1, wherein said frame is provided with a flange; said hollow body and said decorative panel are respectively provided with a peripheral edge for fastening by said flange of said frame.

3. The mobile phone back cover as claimed in claim 1, further comprising a double-sided adhesive tape used to combine said hollow body and said decorative panel on the back of said mobile phone at the same time.

4. The mobile phone back cover as claimed in claim 1, wherein said hollow body of said fragrance unit is independently connectable to the back of said mobile phone.

5. The mobile phone back cover as claimed in claim 1, wherein said hollow body is provided with a buckle edge at a bottom thereof, so that when said hollow body and said decorative panel are combined on the back of said mobile phone at the same time, said decorative panel is stuck to said buckle edge of said hollow body.

6. The mobile phone back cover as claimed in claim 1, wherein said patterns are formed by adhering multiple granular ore or gemstones of different colors to said decorative panel.

7. A mobile phone back cover, comprising:
a fragrance unit comprising a hollow body to be arranged on one side of the camera lens of a mobile phone and an aroma material accommodated in said hollow body, said hollow body comprising a plurality of pores for said aroma material to emit fragrance;
a camera lens protective glass integrally formed with said hollow body and located on one side of said hollow body;
a decorative panel to be located at a bottom side relative said camera lens of said mobile phone and said hollow body, said decorative panel having a surface thereof decorated with different patterns; and
a frame to be detachably combined with said mobile phone to combine said hollow body and said decorative panel on the back of said mobile phone;
wherein said hollow body, said camera lens protective glass and said decorative panel form a peripheral edge for said frame flange to clamp; when fitting said mobile phone through said frame, said hollow body, said camera lens protective glass and said decorative panel are combined on the back of said mobile phone at the same time, and said camera lens protective glass integrally formed with said hollow body are assembled on said camera lens of said mobile phone to achieve the purpose of protecting the lens, emitting fragrance and increasing the beauty and texture of the mobile phone.

8. The mobile phone back cover as claimed in claim 7, wherein said hollow body, said camera lens protective glass and said decorative panel are replaceable as needed; the surface of said decorative panel is decorated with different patterns, or characters to produce different aromas and different patterns, designs or text decorations.

9. The mobile phone back cover as claimed in claim 7, wherein said patterns on said decorative panel are processed granular ore as a substrate, and a single or multiple granular ores or gemstones of different colors are adhered to said decorative panel to form three-dimensional patterns to enhance the texture.

10. The mobile phone back cover as claimed in claim 7, wherein on the back of said hollow body and said decorative panel, said hollow body and said decorative panel are combined on the back of said mobile phone at the same time through double-sided adhesive tape.

11. The mobile phone back cover as claimed in claim 7, wherein said camera lens protective glass, said hollow body and said decorative panel are integrally formed.

12. The mobile phone back cover as claimed in claim 7, wherein said hollow body of said fragrance unit comprises an upper box body, a lower accommodating box and a high absorbency carrier installed in said lower accommodating box, said upper box body having both sides thereof respectively provided with a rail groove, said upper box body having an inner edge of each of both sides thereof respectively provided with a rail that is matched with one respective said rail groove; said pores are set on said upper box body.

13. A mobile phone back cover, comprising:
a fragrance unit comprising a hollow body to be arranged on one side of the camera lens of a mobile phone and an aroma material accommodated in said hollow body, said hollow body comprising a peripheral edge and a plurality of pores for said aroma material to emit fragrance;
a decorative panel to be located at a bottom side relative said camera lens of said mobile phone and said hollow bod, said decorative pane comprising a peripheral edge, said decorative pane having a surface thereof decorated with different flat or three-dimensional patterns, characters or commercial advertisement graphics; and
a frame clamped to the peripheral edge of said hollow body and the peripheral edge of said decorative panel to detachably combine said hollow body and said decorative panel on the back of said mobile phone;
wherein said decorative panel comprises a bottom plate with an accommodating space and a transparent panel, said accommodating space of said bottom plate being divided into a plurality of isolated accommodating areas, said accommodating areas being filled with a plurality of ornaments, and then encapsulated with said transparent panel, so that when the hand holds the mobile phone and shakes, said ornaments shake in each said accommodating area and produce sound effects, and at the same time produce a decorative aesthetic.

14. The mobile phone back cover as claimed in claim 13, further comprising a camera lens protective glass, said camera lens protective glass being set on one side of the hollow body, and said camera lens protective glass being integrally formed with said hollow body, said camera lens protective glass, said hollow body and said decorative panel being able to be integrally formed; said ornaments in said accommodating area are selectively colored granules, or various small flat or three-dimensional objects.

15. The mobile phone back cover as claimed in claim 13, wherein said hollow body of said fragrance unit comprises an upper box body, a lower accommodating box and a high absorbency carrier installed in said lower accommodating box, said upper box body having both sides thereof respectively provided with a rail groove, said upper box body having an inner edge of each of both sides thereof respectively provided with a rail that is matched with one respective said rail groove; said pores are set on said upper box body.

* * * * *